(12) United States Patent
Klein et al.

(10) Patent No.: US 7,533,135 B2
(45) Date of Patent: May 12, 2009

(54) METHODS AND SYSTEMS FOR REDUCING DATABASE ACCESSES IN AN OBJECT-ORIENTED SYSTEM

(75) Inventors: Udo Klein, Maximillansau (DE); René Gross, Heidelberg (DE); René Dehn, Sinsheim (DE)

(73) Assignee: SAP Aktiengesellschaft, Walldorf (DE)

( * ) Notice: Subject to any disclaimer, the term of this patent is extended or adjusted under 35 U.S.C. 154(b) by 412 days.

(21) Appl. No.: 11/171,196

(22) Filed: Jul. 1, 2005

(65) Prior Publication Data

US 2007/0005666 A1  Jan. 4, 2007

(51) Int. Cl.
*G06F 12/00* (2006.01)
(52) U.S. Cl. ...................................... 707/203
(58) Field of Classification Search .............. 707/1, 707/100, 101, 103 R, 103 Y, 103 X, 103 Z, 707/104.1, 203, 200, 201, 202, 204
See application file for complete search history.

(56) References Cited

U.S. PATENT DOCUMENTS

| | | | |
|---|---|---|---|
| 6,510,421 B1 * | 1/2003 | Ganesh et al. | 707/1 |
| 6,691,136 B2 * | 2/2004 | Lee et al. | 707/200 |
| 7,237,226 B2 * | 6/2007 | Simonyi | 717/110 |
| 2001/0056438 A1 * | 12/2001 | Ito | 707/204 |
| 2005/0005071 A1 * | 1/2005 | Gammel et al. | 711/141 |
| 2005/0182758 A1 * | 8/2005 | Seitz et al. | 707/3 |
| 2005/0192922 A1 * | 9/2005 | Edlund et al. | 707/1 |
| 2006/0069885 A1 * | 3/2006 | Matsui et al. | 711/154 |

* cited by examiner

*Primary Examiner*—Hosain T Alam
*Assistant Examiner*—Amy Ng
(74) *Attorney, Agent, or Firm*—Finnegan, Henderson, Farabow, Garrett & Dunner, LLP

(57) ABSTRACT

Systems and methods for minimizing database accesses in an object-oriented system may involve opening an object in a buffer, wherein the buffer is operative to store both an active version of the object comprising active content and an inactive version of the object comprising the inactive content modified by one or more inactive requests. An activation manager may be operative to determine whether the one or more inactive requests are consistent with an applicable object model. Because the buffer stores is operative to store both an active version and an inactive version of the object, it may implement commands to change the object between the inactive and active states without accessing the database. Upon receiving a flush command, the buffer may also be operative to make any version of the object stored in the buffer at that time—whether active, inactive, or both—persistent on the database.

20 Claims, 2 Drawing Sheets

METHODS AND SYSTEMS FOR REDUCING DATABASE ACCESSES IN AN OBJECT-ORIENTED SYSTEM

BACKGROUND OF THE INVENTION

I. Field of the Invention

The present invention generally relates to methods and systems for managing the activation of modifications made to application objects. More particularly, the present invention relates to methods and systems for minimizing database access in object-oriented systems by providing a buffer capable of simultaneously storing an inactive version and an active version of an object and by permitting inactive content of an object to be saved to the database.

II. Background Information

Object-oriented systems providing objects, or records, the content of which may be edited by an application, are known in the art. It is also common for a system to associate an object with an object type. An object type may have comprise a set of rules, or an object model, with which an object of that type must comply. Frequently, modifications made to an object are evaluated to determine whether the modifications are consistent with the object model.

Data that has been deemed consistent with the applicable object model is sometimes referred to as "active." Data that has not yet been deemed consistent is sometimes referred to as "inactive." A request to modify an object may be referred to as a "request." The process of determining whether an inactive request is consistent with the applicable object model may be referred to as an "activation protocol."

An example of an object type may be a payroll information form used by a company to track the payroll information of its employees. In order to ensure that the data is maintained in a uniform and comprehensible manner, the payroll form object type may comprise an object model that dictates which fields of the payroll form are required, as well as the format of acceptable input. A user may modify the content of a particular employee's payroll form, such as by changing the employee's address contained in a "home address" field. Until the update is deemed consistent with the object model, the address change is inactive. Once the request is deemed consistent with the object model, the request may be activated, causing the record to be updated as dictated by the user's request.

Typically, inactive requests to modify an object are stored in a buffer until the user is ready to save changes made to the object to the database. However, activation protocols generally do not allow a user to flush the buffer state without activating any inactive requests. If a request is found to be inconsistent when the user attempts to save the object to the database, the save request will fail and the object will generally be returned to the user, who must alter the request to comply with the object rules before the activation protocol will allow the request to be activated and made persistent on the database. The inability to save inactive content to the database can be burdensome, particularly if the applicable object model includes a large number of required fields or if it includes particularly strict requirements as to content format. In such cases, users may wish to save requested updates to the database without regard to consistency of the current content, and complete their work at a later time. Without the ability to save inactive content, however, the user must first bring the object into a consistent state before saving it to the database.

Further, in systems known in the art, buffers are typically incapable of storing both an inactive version and an active version of an object. As a result, currently known systems typically require buffers to frequently access the database. For example, a buffer may be operative to store only an inactive version of an object, while the active version is stored on the database. If a user desires to roll back inactive requests and return the object to its active state, the buffer may need to access the database to retrieve the active state. This is inefficient, as operations requiring a database access are typically several times slower than operations not requiring database access.

SUMMARY OF THE INVENTION

Consistent with embodiments of the present invention, systems and methods are disclosed for exchanging data between a client and a server.

In accordance with one embodiment, a method for reducing database access in an object-oriented system may comprise opening an object in a buffer, wherein the buffer may be capable of simultaneously storing an active version and an inactive version of the object. The method may further comprise storing active content of the object, if any, in the active version and storing an inactive request to modify the content of the object in the inactive version. The method may also include, upon receiving a command to activate the inactive request, determining whether the inactive request is consistent with an object model. If the inactive request is deemed consistent, the method may include updating the active version stored in the buffer with the inactive request. Upon receiving a command to make the object persistent on a database, the method may comprise flushing all versions of the object stored in the buffer, whether active or inactive, to the database.

According to another embodiment, a system for reducing database access in an object-oriented system may comprise an application operative to open an object, the application being operative to edit content of the object by issuing an inactive request. The system may comprise a buffer operative to store the object, the buffer being operative to simultaneously store active content of the object in an active record and one or more inactive requests to modify the active content in an inactive record. The system may further comprise an activation manager operative to determine, upon a command from the application, whether the inactive request is consistent with an object model. The buffer may be operative to, upon the application manager deeming the one or more inactive requests consistent, update the active record with the consistent requests. The buffer may further be operative to, upon receiving a flush command from the application, to make all records of the object stored in the buffer, both active and inactive, persistent on the database.

In accordance with yet another embodiment, a computer-readable medium which stores a set of instructions which when executed performs a method for reducing database access in an object-oriented system, the computer-readable medium executed by the set of instructions comprising prompting an application to open an object in a buffer. The set of instructions may further comprise prompting the buffer to store active content of the object in an active record of the object and to store an inactive request to modify the active content in an inactive record of the object. The set of instructions may also comprise, upon a request from the application, prompting an activation manager, to activate the inactive request stored in the inactive record by determining whether the inactive request is consistent with an object model. The set of instructions may further comprise, if the inactive request is deemed consistent, prompting the buffer to update the active record stored in the buffer with the consistent request and to discard the inactive record. The set of instructions may also comprise, upon a command from the application to flush the buffer content to the database, prompting the buffer to make all records, both active and inactive, persistent on the database.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
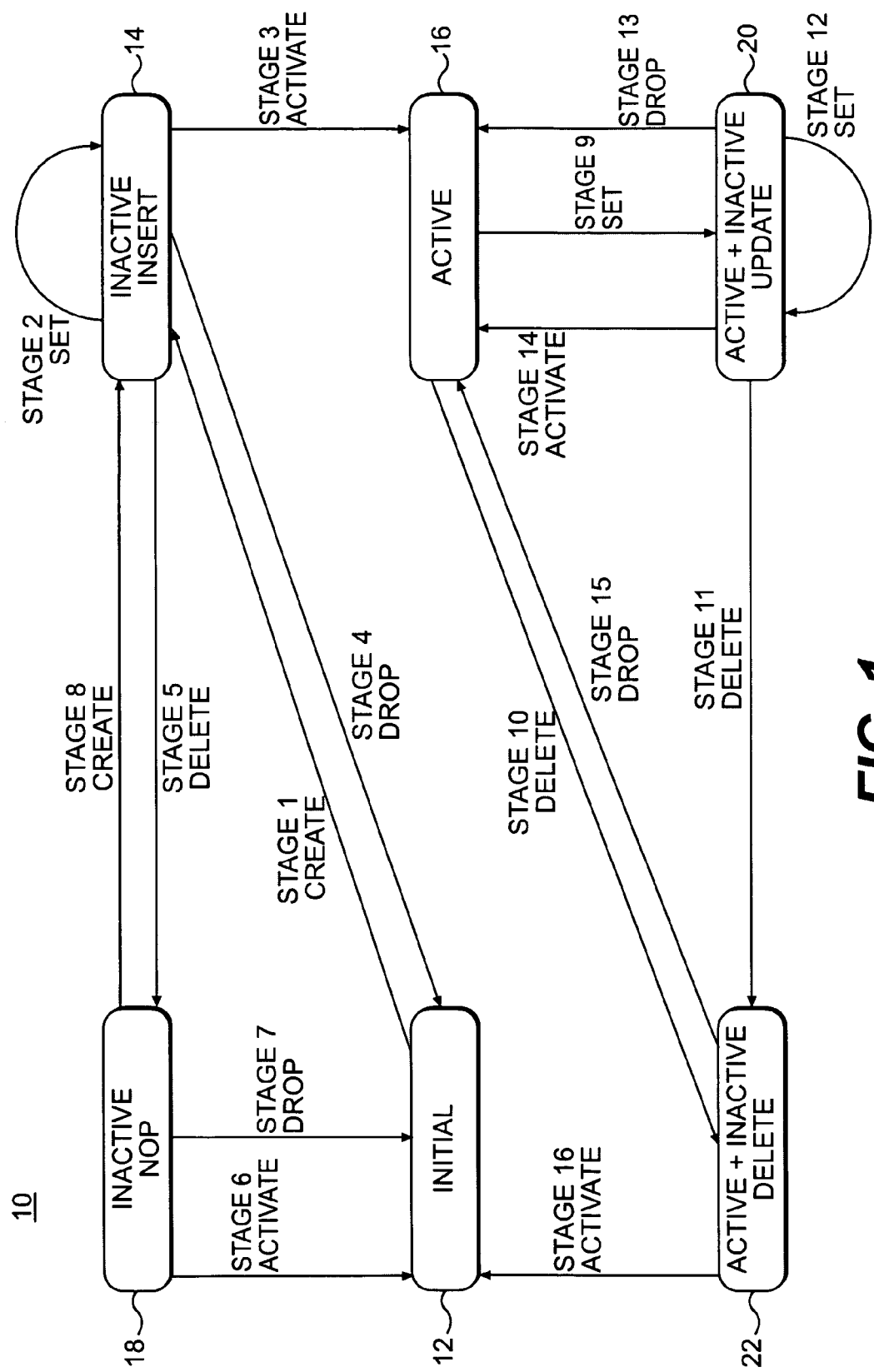
FIG. 1 is a flow diagram illustrating the operation of a system for minimizing database access in an object-oriented system consistent with the principles of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible without departing from the spirit and scope of the invention. For example, substitutions, additions and/or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

As embodied herein, methods and systems for minimizing database accesses in an object-oriented system are provided. According to methods and systems consistent with the principles of the present invention, it may be possible to store both an inactive version and an active version of an object in a buffer. In this manner, the buffer need not access the database in the course of routine operations, such as rolling back an object from an inactive state to a previously existing active state. By allowing all operations to be performed in the buffer, it is possible to avoid accessing the database until the user desires to make the buffer content persistent, optimizing the use of system resources. Consistent with the principles of the present invention, it may also be possible to save inactive versions of an object to the database. By enabling inactive content to be saved to the database, the user may work in an object over the course of multiple sessions without having to make the object consistent with an applicable object model at the end of each session.

FIG. 1 is a state diagram illustrating the operation of a method 10 for minimizing database access in an object-oriented system consistent with the principles of the present invention. Initial state 12 represents the start of an activation protocol for managing inactive update requests. From initial state 12, a user may add new input to the object moving to an inactive insert 14 (stage 1). The act of creating an object from initial state 12, for example, may move the object to the inactive insert state 14. Insert state 14 is inactive because the update request has not been evaluated against the applicable object model to determine its consistency. Further modification of the object by the user after reaching inactive insert state 14 is represented as stage 2. The inactive modification requests represented in stage 2 do not change the state of the object, as it was already in an inactive state. The user may convert the object to the active state 16 by calling an activation manager that is operative to determine whether inactive insert state 14 is consistent with the object model. If all requests in inactive insert state 14 are deemed consistent, the requests may be made active, changing the object to active object state 16 (stage 3). The activation protocol may be called by the application in various manners consistent with the principles of the present invention. For example, an application user interface may include a button that the user may engage to check all objects in inactive insert states 14 for consistency.

As an alternative to activating requests for objects in the inactive insert state 14, the user may engage a "drop" feature that may be operative to roll the object back to the most recent active state. From inactive insert state 14, however, the drop feature may be operative to return the object to initial state 12 (stage 4) if there is no active state preceding inactive insert state 14.

From inactive insert state 14, the user may also delete a request from an object, moving the object to an inactive "no operation" state 18 (stage 5). Because the user has not engaged the roll back mechanism of the drop feature, the delete request for the request for an object in inactive insert state 14 does not have the effect of returning the object directly to initial state 12. From inactive no operation state 18, the user may activate the delete request and, if consistent with the object model, cause the object to return to its initial state 12 (stage 6). Alternatively, the user may engage the drop feature to roll the object back to initial state 12 (stage 7). From no operation state 18, the user may also make an update to the content of the object (stage 8). Because the update request has not been checked for consistency with the object model, the object is returned to inactive insert state 14.

From active state 16, the user may update the object, causing it to change to an inactive update state 20 comprising an active record and an inactive update request (stage 9). The user may also delete the object, causing it to move to an inactive delete state 22 comprising an active record and an inactive delete request (stage 10).

From inactive update state 20, the user may modify the object by deleting the object, including both active and inactive content, by making a delete request (stage 11), moving the object to inactive delete state 22. From inactive update state 20, the user may also update the object with additional inactive requests (stage 12). Alternatively, from inactive update state 20, the user may drop the inactive update request and return to active state 16 (stage 13). From inactive update state 20, the user may also activate the object (stage 14). If the inactive update request is consistent with the object model, the updates will be applied to the active record and return the object to active state 16.

At inactive delete state 22, the object comprises active content and an inactive request to delete the object. From state 22, the user may drop the delete request, rolling back the inactive delete request and restoring the active content of the object, returning the object to active state 16 (stage 15). The user may also activate the delete request (stage 16). If the delete request is consistent with the object model, activation of the delete request may delete the object, returning the object to initial state 12.

As mentioned above, a system consistent with the principles of the present invention may comprise a buffer operative to simultaneously store both an active version and an inactive version of an object. Thus, for example, when the user makes an inactive request to update the content of an active record, the buffer may be operative to store both (i) the active record reflecting the object state before the inactive request is implemented; (ii) and the inactive record reflecting the object state after implementing the inactive request.

For example, with reference to FIG. 1, at inactive update state 20, the object comprises active content and an inactive update request. The buffer may be operative to store the active content in an active record. This active version may be termed the "before" image because it reflects the object state existing before inactive modification requests are implemented. The buffer may also be operative to store the active content as modified by the inactive request in an inactive record. This inactive version may be termed the "after" image because it reflects the object state existing after the active content is changed by the inactive modification request. Because the buffer contains both the "before" image and the "after" image, all operations may be performed in the buffer without accessing the database until the user desires to make the buffer content persistent. For example, at inactive update state 20 the object comprises active content and an inactive update request. The user may drop the inactive update request, returning the object from inactive update state 20 (the "after" image) to active state 16 (the "before" image). Because the buffer stores the "before" image as well as the "after" image, it need not access the database to retrieve the "before" image.

In one aspect, a system consistent with the principles of the present invention may comprise an activation manager operative to apply the activation protocol to determine whether inactive requests from a user to modify an object are consistent with the applicable object model. Upon receiving a request to activate one or more inactive requests, the activation manager may open a logical unit of work (LUW), in which each request comprises a separate operation. If all inactive requests are deemed consistent with the object model, the active record stored in the buffer may be updated (or created, if no active record previously existed) to reflect the modifications contained in the requests. In one version, after the active record is updated with the newly activated modification requests, it is no longer possible to roll the object back to the state existing before the (previously inactive) modification requests were implemented. If one or more of the inactive requests are deemed inconsistent, the activation manager may be operative to roll back activation request such that neither the active nor the inactive record stored in the buffer are altered.

Inactive update state 20 may comprise an inactive record and an active record, each stored in a buffer. In order to activate the inactive request, the user may engage the activation manager. If the operations comprising the inactive request are deemed consistent with the object model, the active record is changed to reflect the modification requests and the object is returned to active state 16. At this point, no inactive record is stored in the buffer because there are no inactive requests. Conversely, if one or more of the operations comprising the inactive request are deemed inconsistent with the object model, the changes are not implemented and neither the inactive record nor the active record stored in the buffer are altered.

Figure 2:
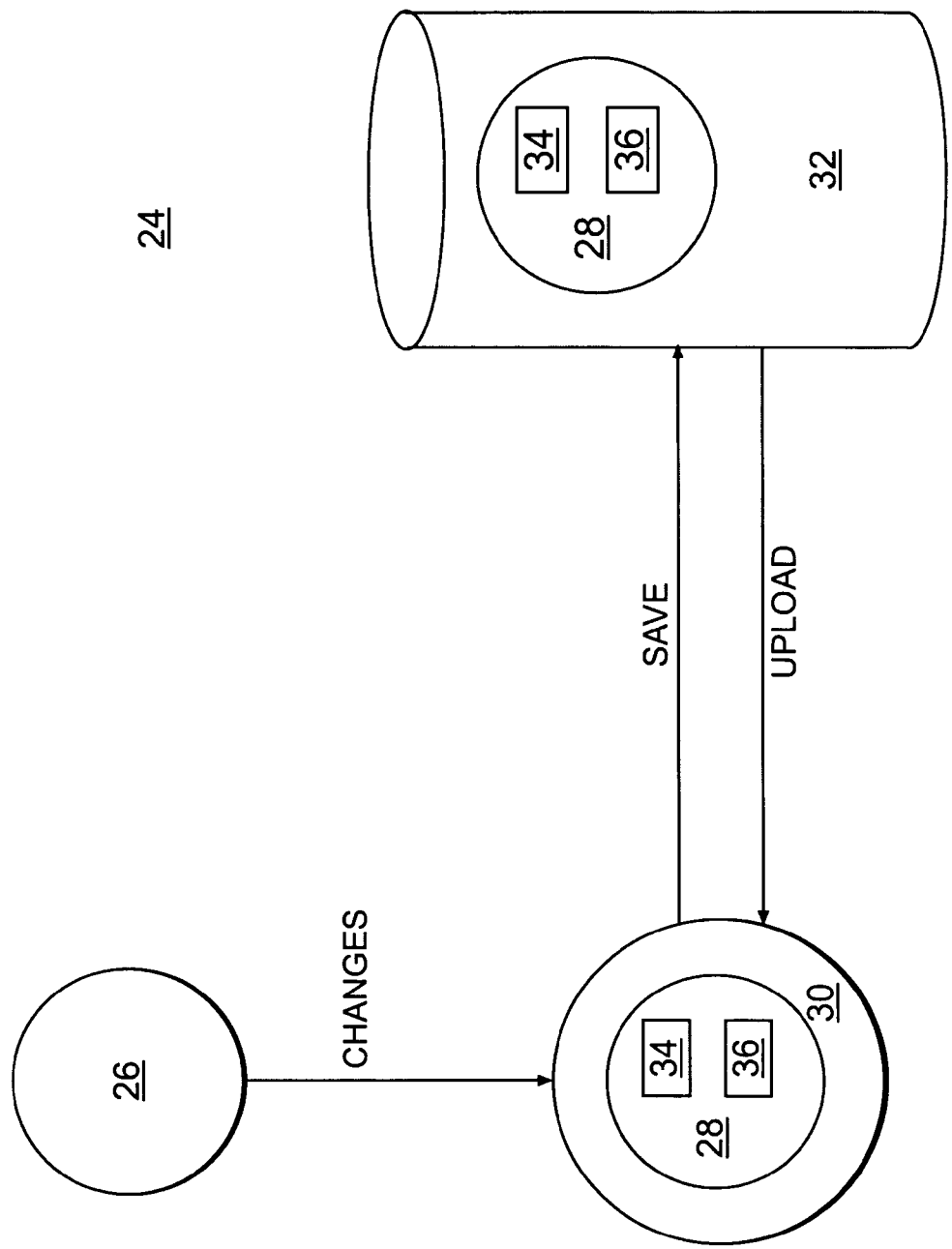
FIG. 2 is a flow diagram illustrating the operation of a system consistent with the principles of the present invention.

Consistent with the principles of the present invention, it may be possible to flush the content of the buffer to the database at any point in the operations described with reference to FIG. 1, whether or not the buffer contains active or inactive content. FIG. 2 is a flow diagram illustrating the operation of a system 24 consistent with the principles of the present invention. The system may comprise an application 26 which a user may employ to read or work in an object 28. The system may further comprise a buffer 30 and an underlying database 32. In response to a request from application 26, buffer 30 may store an instance of object 28. Buffer 30 may be operative to store an active version 34 of object 28 comprising active content—a "before" image. Buffer 30 may also be operative to store an inactive version 36 of object 28 comprising active content modified by inactive modification requests—an "after" image.

Upon receiving a flush command from application 26, buffer 30 may be operative to make object 28 persistent on database 32. Buffer 30 may be operative to flush any version of object 28—whether active version 34, inactive version 36, or both—to database 32 upon receiving the flush command. Database 32 may be operative to store any version of object 28 it receives from buffer 30 without altering its state. In this manner, a user working in object 28 may save it to database 32 at any stage of operations, regardless of the consistency of the content with an applicable object model. Similarly, application 26 may request that buffer 30 retrieve either active version 34 or inactive version 36 of object 28 from database 32.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for reducing database access in object-oriented systems, comprising:
   opening an object in a buffer, wherein the buffer is capable of simultaneously storing an active version and an inactive version of the object;
   storing active content of the object, if any, in the active version of the object in the buffer;
   storing an inactive request in the inactive version of the object in the buffer;
   upon receiving a command to activate the inactive request, determining whether the inactive request is consistent with an object model;
   if the inactive request is consistent, updating the active version stored in the buffer with the inactive request; and
   upon receiving a command to make the object persistent in a database, flushing all versions of the object stored in the buffer, both active and inactive, to the database, thereby allowing both versions of the object, active or inactive, to be stored simultaneously on the database for later retrieval.

2. The method of claim 1, wherein the object opened in the buffer is retrieved from the database and wherein storing further comprises storing the retrieved object in the buffer as an active record if the object is active on the database and storing in the buffer as an inactive record if the object is inactive on the database.

3. The method of claim 1, further comprising, upon determining that the inactive request is consistent and updating the active version stored in the buffer with the consistent request, discarding the inactive version from the buffer.

4. The method of claim 1, further comprising, upon receiving a command to activate the inactive request, opening a logical unit of work comprising one or more operations contained in the inactive request.

5. The method of claim 3, further comprising rolling back the logical unit of work if one or more of the operations is deemed inconsistent with the object model.

6. The method of claim 4, further comprising leaving the inactive version and the active version intact in the buffer if the logical unit of work is rolled back.

7. A system for reducing database accesses in an object-oriented system comprising a processor and memory containing instructions that when executed by the processer:
   (i) executes an application operative to open an object, the application being operative to edit content of the object by issuing an inactive request;
   (ii) manages a buffer operative to store the object, the buffer is operative to simultaneously store, in the buffer, active content of the object in an active record and one or more inactive requests to modify the active content in an inactive record;
   (iii) executes an activation manager operative to determine, upon a command from the application, whether the inactive request is consistent with an object model;
   (iv) upon the application manager determining that the one or more inactive requests is consistent, updates the active record with the inactive request; and
   (v) upon receiving a flush command from the application, makes all versions of the object stored in the buffer, both active and inactive, persistent on the database, thereby allowing both versions of the object, active and inactive, to be stored simultaneously on the database for later retrieval.

8. The system of claim 7, wherein, upon a command from the application, the activation manager is operative to open a logical unit of work comprising the one or more inactive requests.

9. The system of claim 7, wherein upon the activation manager determining that one of the one or more inactive requests is inconsistent, the buffer being operative to leave the inactive record and the active record stored in the buffer unchanged.

10. The system of claim 7, wherein upon the activation manager determining that the one or more inactive requests is consistent and updating the active record with the consistent request.

11. The system of claim 7, wherein the inactive record comprises an inactive insert request.

12. The system of claim 7, wherein the inactive record comprises active content and an inactive update request.

13. The system of claim 7, wherein the inactive record comprises active content and an inactive delete request.

14. The system of claim 7, wherein the activation manager is operative to implement a request from the application to check the consistency of the inactive record without activating the inactive record, wherein the inactive record and the active record stored in the buffer are left intact regardless of whether the inactive content of the inactive record is deemed consistent.

15. The system of claim 7, wherein the buffer may be operative to implement a request from the application to create a new object, wherein the new object is stored in the buffer in the inactive version.

16. The system of claim 7, wherein the application is operative to command the buffer to retrieve the inactive record of the object from the database.

17. The system of claim 7, wherein the application is operative to command the buffer to retrieve the active record of the object from the database.

18. A computer-readable storage medium which stores a set of instructions which when executed by a processer performs a protocol for reducing database accesses in an object-oriented system, the computer-readable medium executed by the set of instructions comprising:
   (i) prompting an application to open an object in a buffer
   (ii) prompting the buffer to store active content of the object in an active record of the object in the buffer and to store an inactive request to modify the active content in an inactive record of the object in the buffer;
   (iii) prompting an activation manager, upon a request from the application, to activate the inactive request stored in the inactive record by determining whether the inactive request is consistent with an object model;
   (iv) if the inactive request is deemed consistent, prompting the buffer to update the active record stored in the buffer with the consistent request and to discard the inactive record; and
   (v) prompting the buffer, upon a command from the application to flush the buffer content to the database, to make all records, both active and inactive, persistent on the database, thereby allowing both versions of the record, active and inactive, to be stored simultaneously on the database for later retrieval.

19. The computer-readable medium of claim 18, further comprising, upon a request by the application to activate the inactive request, prompting the activation manager to open a logical unit of work comprising one or more operations contained in the inactive request.

20. The computer-readable medium of claim 19, wherein further if the activation manager determines that one or more of the operations of the inactive request is inconsistent, rolling back the logical unit of work and leaving the inactive record and the active record intact in the buffer.

* * * * *